July 30, 1929.  S. B. WINN  1,722,692

SWIVEL DUMP BODY FOR MOTOR TRUCKS

Filed March 28, 1925  2 Sheets-Sheet 1

Inventor
Sidney B. Winn,
By
Attorneys

July 30, 1929.    S. B. WINN    1,722,692
SWIVEL DUMP BODY FOR MOTOR TRUCKS
Filed March 28, 1925    2 Sheets-Sheet 2

Inventor
Sidney B. Winn.

By
Attorneys

Patented July 30, 1929.

1,722,692

UNITED STATES PATENT OFFICE.

SIDNEY B. WINN, OF LAPEER, MICHIGAN.

SWIVEL DUMP BODY FOR MOTOR TRUCKS.

Application filed March 28, 1925. Serial No. 18,973.

This invention relates to a swivel dump body for trucks, semi-trailers, and other types of commercial vehicles, and my invention aims to furnish a truck chassis with a rotatable frame supporting a tiltable dump body and means for tilting said dump body so that it may discharge its load at any position the rotatable frame is placed relative to the truck chassis. For instance, a loaded truck may discharge its load at either side and this is advantageous in the delivery of coal and other matter or material, particularly on the street, since it obviates the necessity of backing a truck endwise to a curve.

My invention further aims to furnish a motor truck with a swiveled tiltable endwise dump body that may be swung at an angle to the truck and secured in such position during the discharge of a load. To accomplish this, a turntable is employed and a suitable hoisting mechanism with provision for operating the hoisting mechanism from the truck through the turntable, thus establishing an operative relation between the hoisting mechanism and a suitable source of power for tilting the dump body when positioned for the discharge of a load.

Other advantages may be gained from the use of my invention and as suggestive of the manner of carrying it into practice, reference will be had to the drawings, wherein:—

Figure 1:
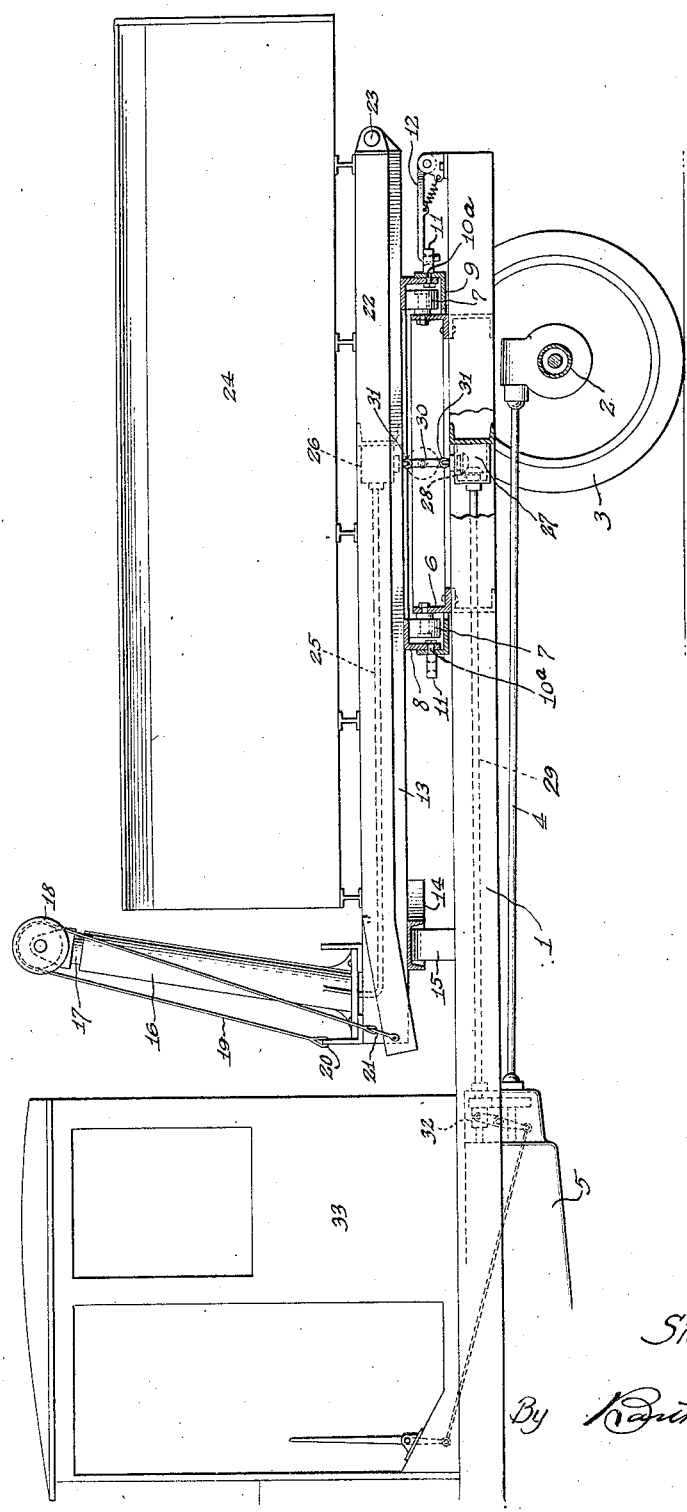
Figure 2:
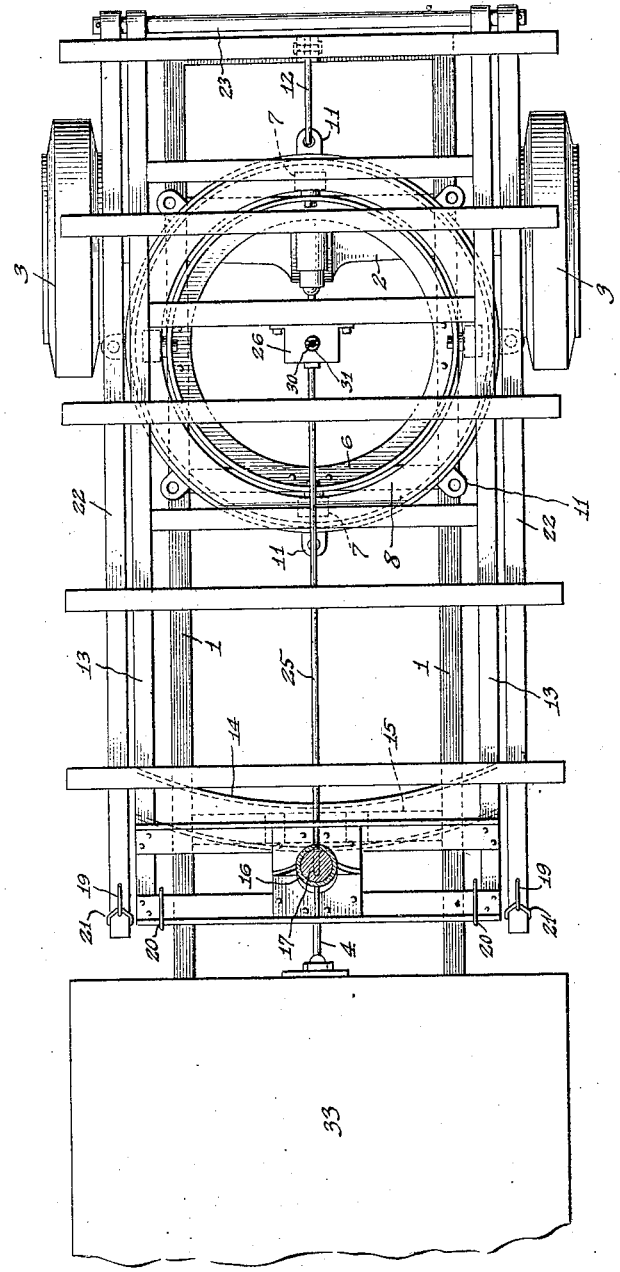

Figure 1 is a side elevation of a portion of the truck, partly broken away and partly in section, showing a swiveled and tiltable dump body in a normal position on the truck chassis; and Figure 2 is a plan of the same with the dump body removed from its tiltable support.

In the drawings, the reference numeral 1 denotes a motor truck chassis having a rear axle assembly 2, including wheels 3 adapted to be driven by a conventional form of power transmission means 4 from the transmission mechanism 5 of the truck, or some other driven part or parts of said truck.

On the rear end of the truck chassis 1 is the inner annular member 6 of a turntable or swivel, said member being provided with a plurality of radially disposed antifrictional rollers 7, or like members, supporting an outer annular member 8, provided with an annular housing member 9, which cooperates with the outer member 8 in forming a housing for the rollers 7. The housing member 9 also serves as an abutment should the outer member 8 attempt to tilt relative to the inner member 6. The members 8 and 9 may be suitably secured together, for instance, by eye-bolts $10^a$, serving as keepers 11, in connection with a pivoted spring pressed latch 12 supported on the rear end of the truck chassis 1. There being a plurality of the keepers spaced about the turntable, the latch may be placed in either keeper to hold the turntable in an adjusted position relative to the truck chassis.

Mounted on the outer member 8 of the turntable is a frame 13 having its forward end provided with a curved rail or shoe 14, for engagement with a support 15, on the truck chassis, said shoe and support cooperating with the turntable in providing a substantial support for the frame 13 on the truck chassis.

On the forward end of the frame 13 and preferably central thereof, is a conventional form of hydraulic or pneumatic hoisting mechanism 16, including a plunger or piston 17 from which are supported sheaves 18 for cables 19, said cables being attached to the forward end of the frame 13, as at 20, and to the forward ends or links 21, of the tiltable body support 22. The tiltable body support has its rear end pivotally connected, as at 23, to the rear end of the frame 13 and suitably mounted on the support 22, is a body 24 adapted to have a load discharged from its rear end which overhangs the rear end of the truck chassis.

Extending rearwardly from the hoisting mechanism 16, is a motive fluid supply pipe 25 connected to a conventional form of pump 26 mounted in the frame 13 coaxially of the turntable.

Mounted in the truck chassis 1, below the pump 26, is a gear box 27, for gears 28 adapted to transmit power from a power take-off shaft 29, to a shaft 30 axially of the turntable, said shaft having universal joints, or connections 31, establishing an operative connection with the pump 26, so that the power shaft 29 may be driven to operate the pump 26 and the hoisting mechanism 16, irrespective of the position of the turntable relative to the truck chassis. The power take-off shaft 29 may receive its power from the transmission mechanism 5 of the truck, or from any other driven part or parts of the truck; there being a conventional form of control 32 for the power take-off shaft 29, with the control mechanism 32 operatable from a cab 33, or driver's position on the truck.

There are various types of hoisting mechanisms that may be mounted on the forward end of the swiveled frame 13 to tilt the body 24, and whatever type of hoisting mechanism adopted, it is to be operated by power transmision means extending axially of the turntable, or approximately so, whereby the hoisting mechanism and power transmission thereto cannot interfere with the swivel action of the frame 13 supporting the tiltable body.

It is obvious that the tiltable body and its supporting frames will be properly proportioned relative to the truck chassis so that the body, loaded or unloaded, may be safely manipulated relative to the truck chassis. It is thought that the operation of swinging the dump body to a desired position and tilting it, wil be apparent without further description and while in the drawings there is illustrated a preferred embodiment of my invention, it is to be understood that the swivel and tiltable features are applicable to various types of vehicles and vehicle bodies, therefore, I do not care to confine my invention to any particular construction or arrangement of parts, other than defined in the appended claim.

What I claim is:—

The combination of a motor truck having a rear axle assembly, a transmission mechanism, power transmission means from said transmission mechanism to said rear axle assembly, means within the cab of the truck for rendering the power transmission means active and inactive at will, a rearwardly extending power take-off shaft disposed substantially parallel to said power transmission means and adapted to be driven from said transmision mechanism, a turn table on said truck, a frame on said turn table, a tiltable dump body supported from said frame, a hydraulic hoist mechanism on said frame adapted for tilting said body, a pump carried by said frame coaxially of and above the plane of said turn-table and operatively connected to said hoist mechanism, and means including a jointed shaft extending through said turn-table and operatively connecting the pump and said power take-off shaft for operating said pump.

In testimony whereof I affix my signature.

SIDNEY B. WINN.